United States Patent
Gaidon

(10) Patent No.: US 11,574,468 B2
(45) Date of Patent: Feb. 7, 2023

(54) SIMULATION-BASED LEARNING OF DRIVER INTERACTIONS THROUGH A VEHICLE WINDOW

(71) Applicant: Toyota Research Institute, Inc., Los Altos, CA (US)

(72) Inventor: Adrien David Gaidon, Mountain View, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 184 days.

(21) Appl. No.: 16/835,454

(22) Filed: Mar. 31, 2020

(65) Prior Publication Data

US 2021/0303856 A1    Sep. 30, 2021

(51) Int. Cl.
| | |
|---|---|
| G06V 20/20 | (2022.01) |
| G06K 9/62 | (2022.01) |
| G06N 3/08 | (2006.01) |
| G06V 10/75 | (2022.01) |
| G06V 20/59 | (2022.01) |

(Continued)

(52) U.S. Cl.
CPC .............. *G06V 20/20* (2022.01); *B60W 40/09* (2013.01); *G06K 9/6256* (2013.01); *G06N 3/08* (2013.01); *G06V 10/76* (2022.01); *G06V 20/59* (2022.01); *G06V 40/20* (2022.01)

(58) Field of Classification Search
CPC ........... G06K 9/00671; G06K 9/00335; G06K 9/00832; G06N 3/08
See application file for complete search history.

(56) References Cited

U.S. PATENT DOCUMENTS

| | | | | |
|---|---|---|---|---|
| 9,477,881 | B2* | 10/2016 | Konishi | ................. H04N 7/188 |
| 10,836,309 | B1* | 11/2020 | Trundle | ............... G08G 1/0116 |
| 10,861,144 | B1* | 12/2020 | Guan | ................. G06K 9/00369 |

(Continued)

FOREIGN PATENT DOCUMENTS

| | | | | |
|---|---|---|---|---|
| CN | 104850846 B | * | 8/2018 | ......... G06K 9/00369 |
| KR | 20150069996 | * | 6/2015 | ............... A61B 6/03 |

(Continued)

OTHER PUBLICATIONS

Chan et al., "Everybody Dance Now", unarXiv:1808.07371v2, UC Berkeley, Aug. 2019 (12 pages).

*Primary Examiner* — Grace Q Li
(74) *Attorney, Agent, or Firm* — Christopher G. Darrow; Darrow Mustafa PC

(57) ABSTRACT

A model can be trained to detect interactions of other drivers through a window of their vehicle. A human driver behind a window (e.g., front windshield) of a vehicle can be detected in a real-world driving data. The human driver can be tracked over time through the window. The real-world driving data can be augmented by replacing at least a portion of the human driver with at least a portion of a virtual driver performing a target driver interaction to generate an augmented real-world driving dataset. The target driver interaction can be a gesture or a gaze. Using the augmented real-world driving data set, a machine learning model can be trained to detect the target driver interactions. Thus, simulation can be leveraged to provide a large set of useful training data without having to acquire real-world data of drivers performing target driver interactions as viewed from outside the vehicle.

20 Claims, 2 Drawing Sheets

(51) Int. Cl.
  *G06V 40/20* (2022.01)
  *B60W 40/09* (2012.01)

(56) References Cited

U.S. PATENT DOCUMENTS

| | | | |
|---|---|---|---|
| 10,885,691 B1* | 1/2021 | Parker | G06T 13/40 |
| 2014/0195214 A1* | 7/2014 | Kozloski | G08G 1/0129 |
| | | | 703/8 |
| 2014/0375810 A1 | 12/2014 | Rodriguez | |
| 2017/0072880 A1 | 3/2017 | Higgins-Luthman et al. | |
| 2017/0124407 A1 | 5/2017 | Micks et al. | |
| 2018/0012093 A1 | 1/2018 | Micks et al. | |
| 2018/0158246 A1* | 6/2018 | Grau | G06T 3/0093 |
| 2018/0288161 A1* | 10/2018 | Saxena | H04W 4/33 |
| 2019/0147582 A1 | 5/2019 | Lee et al. | |
| 2021/0232858 A1* | 7/2021 | Mukherjee | G06K 9/00214 |

FOREIGN PATENT DOCUMENTS

| | | | | |
|---|---|---|---|---|
| WO | 2019226051 A1 | 11/2019 | | |
| WO | WO-2019215550 A1 * | 11/2019 | | A61C 7/002 |

\* cited by examiner

SIMULATION-BASED LEARNING OF DRIVER INTERACTIONS THROUGH A VEHICLE WINDOW

FIELD

The subject matter described herein relates in general to vehicles and, more particularly, to driver interactions.

BACKGROUND

Driving typically involves obeying the rules of the road and following social norms. Important social cues can be gleaned from what the other drivers are communicating through their windows. For example, other drivers may be communicating non-verbally, such as by their gaze (if they have seen or are paying attention to an ego vehicle) and/or by their gestures.

SUMMARY

Figure 1:
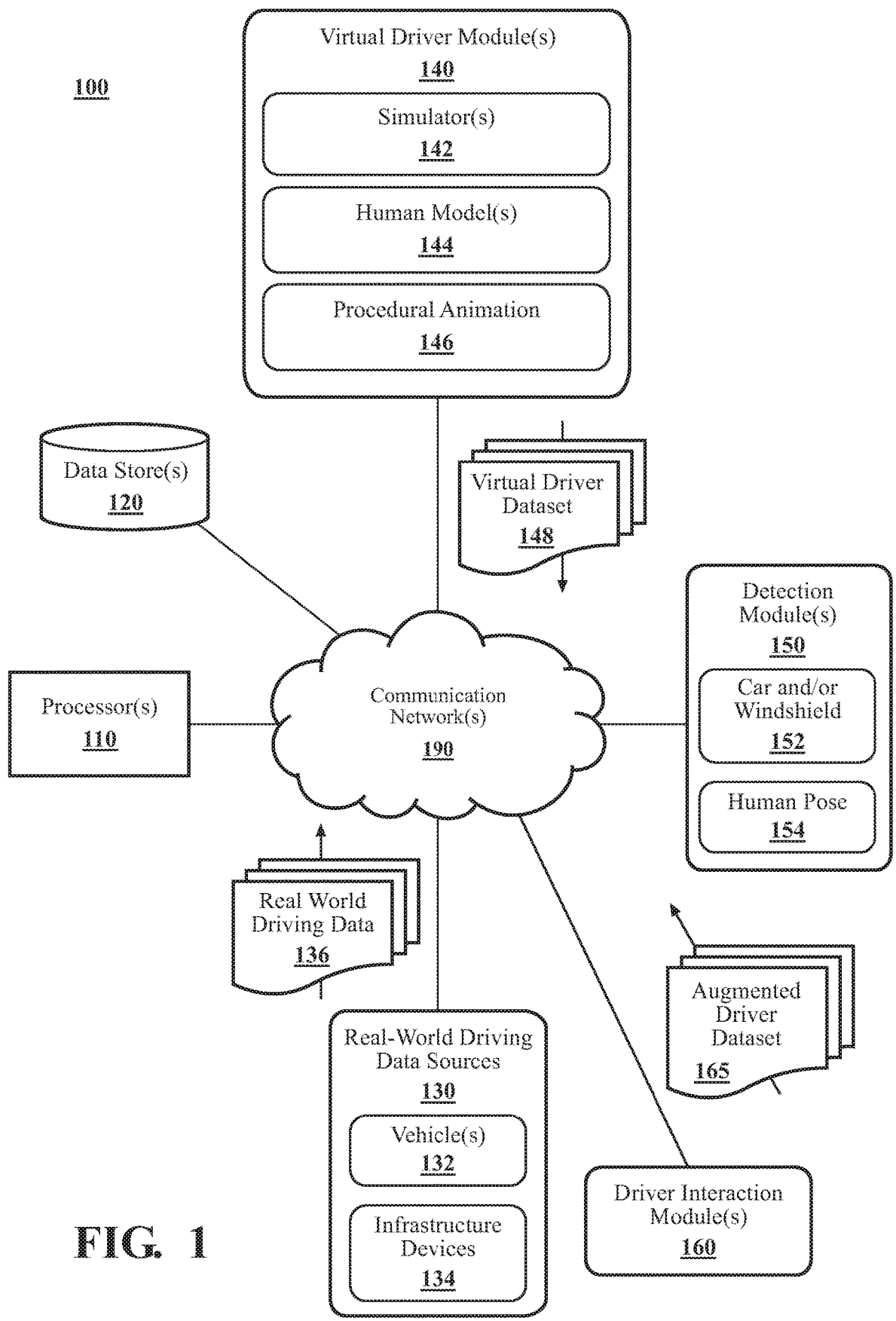
FIG. 1 is an example of a system of training a model to detect driver interactions through a window of a vehicle.

In one respect, the subject matter presented herein relates to a method of training a model to detect driver interactions through a window of a vehicle. The method includes detecting a human driver behind a window of a vehicle in real-world driving data. The method also includes tracking the human driver behind the window of the vehicle over time. The method further includes augmenting the real-world driving data set by replacing at least a portion of the human driver with at least a portion of a virtual driver performing a target driver interaction. The method includes training a model, using the augmented real-world driving data set, to detect the target driver interactions.

In one respect, the subject matter presented herein relates to a system for training a model to detect driver interactions through a window of a vehicle. The system includes one or more processors, the one or more processors being programmed to initiate executable operations. The executable operations include detecting a driver behind a window of a vehicle in real-world driving data. The executable operations also include tracking the driver behind the window of the vehicle over time. The executable operations further include augmenting the real-world driving data set by replacing at least a portion of the human driver in the real-world driving data with at least a portion of a virtual driver performing a target driver interaction. The executable operations include training a model, using the augmented real-world driving data set, to detect the target driver interactions.

DETAILED DESCRIPTION

Perceiving driver interactions can be challenging for sensors. Moreover, such interactions typically happen scarcely, thereby limiting access to data. Further, these interactions typically happen at large distances and through the window of the vehicle, making some data (e.g., visual data) blurry and hard to label. Thus, it is difficult to obtain sufficient and/or quality training data to train a model to recognize driver interactions through a window of a vehicle.

According to arrangements described herein, simulation can be used to train a machine learning model, including, for example, deep neural networks, to detect driver interactions through the front windshield or other window of a vehicle. Examples of such driver interactions can include the gaze of the driver and/or gestures of the driver.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-2, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Figure 2:
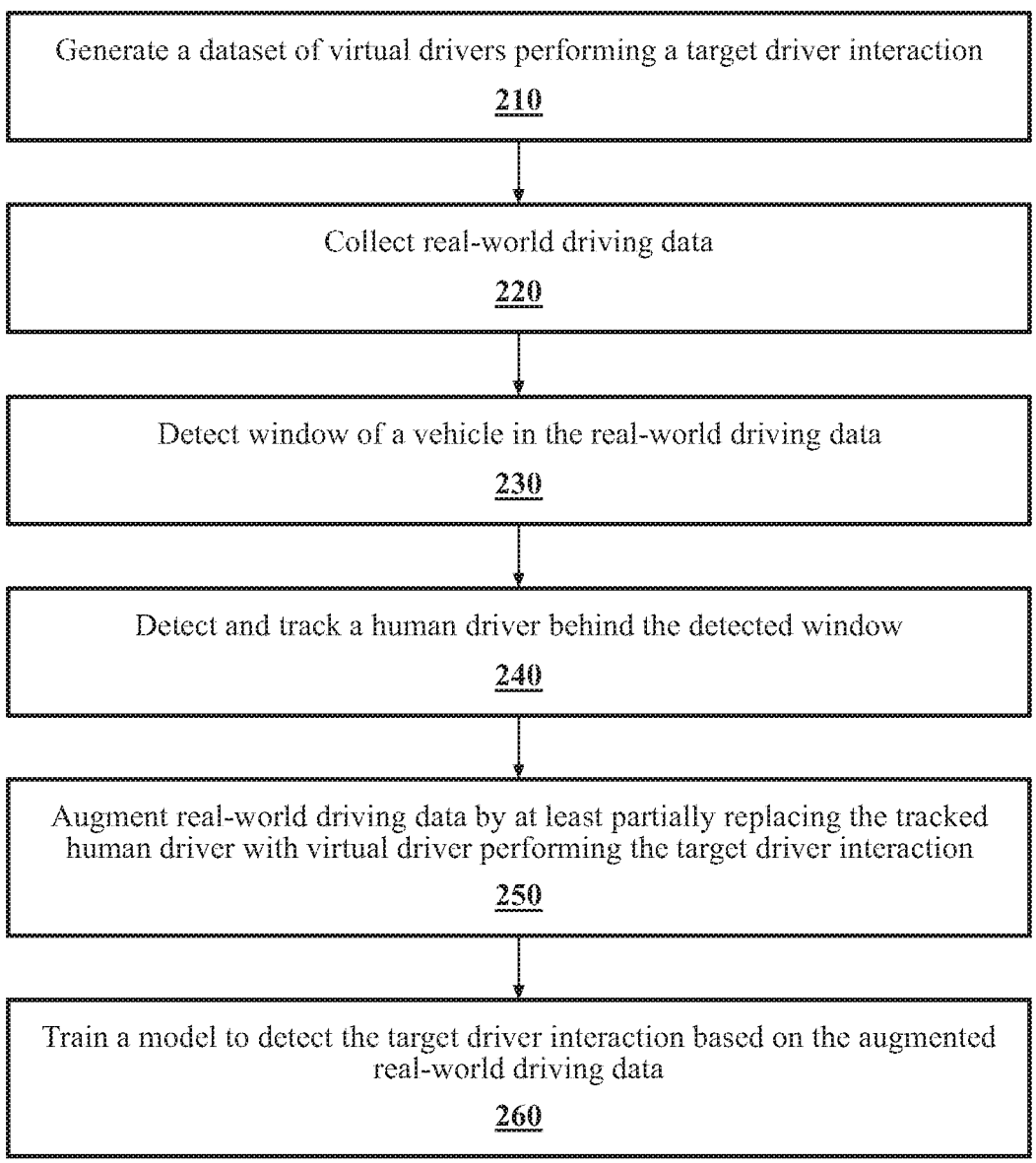
FIG. 2 is an example of a method for training a model to detect driver interactions through a window of a vehicle.

Referring to FIG. 1, an example of a system 100 for of training a model to detect driver interactions through a window of a vehicle is shown. Some of the possible elements of the system 100 are shown in FIG. 1 and will now be described. It will be understood that it is not necessary for the system 100 to have all of the elements shown in FIG. 1 or described herein. The system 100 can include one or more processors 110, one or more data stores 120, one or more real-world driving data sources 130, and/or one or more modules (e.g., virtual driver module(s) 140, detection module(s) 150, driver interaction module(s) 160, etc.).

The various elements of the system 100 can be communicatively linked to each other (or any combination thereof) through one or more communication networks 190. As used herein, the term "communicatively linked" can include direct or indirect connections through a communication channel or pathway or another component or system. A "communication network" means one or more components designed to transmit and/or receive information from one source to another. The data store(s) 120 and/or one or more of the elements of the system 100 can include and/or execute suitable communication software, which enables the various elements to communicate with each other through the communication network and perform the functions disclosed herein.

The one or more communication networks 190 can be implemented as, or include, without limitation, a wide area network (WAN), a local area network (LAN), the Public Switched Telephone Network (PSTN), a wireless network, a mobile network, a Virtual Private Network (VPN), the Internet, and/or one or more intranets. The one or more communication networks 190 further can be implemented as or include one or more wireless networks, whether short range (e.g., a local wireless network built using a Bluetooth or one of the IEEE 802 wireless communication protocols, e.g., 802.11a/b/g/i, 802.15, 802.16, 802.20, Wi-Fi Protected Access (WPA), or WPA2) or long range (e.g., a mobile, cellular, and/or satellite-based wireless network; GSM, TDMA, CDMA, WCDMA networks or the like). The communication network(s) 190 can include wired communication links and/or wireless communication links. The communication network(s) 190 can include any combination of the above networks and/or other types of networks.

Each of the above noted elements of the system 100 will be described in turn below. The system 100 can include one or more processors 110. "Processor" means any component or group of components that are configured to execute any of the processes described herein or any form of instructions to carry out such processes or cause such processes to be performed. The processor(s) 110 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 110 can include at least one hardware circuit (e.g., an integrated circuit) configured to carry out instructions contained in program code. In arrangements in which there is a plurality of processors 110, such processors can work independently from each other or one or more processors can work in combination with each other.

The system 100 can include one or more data stores 120 for storing one or more types of data. The data store 120 can include volatile and/or non-volatile memory. Examples of suitable data stores 120 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 120 can be a component of the processor(s) 110, or the data store 120 can be operatively connected to the processor(s) 110 for use thereby. The term "operatively connected," as used throughout this description, can include direct or indirect connections, including connections without direct physical contact.

The system 100 can include one or more real-world driving data sources 130. The real-world driving data source(s) 130 can include any devices, components and/or systems configured to acquire, collect, and/or sense real-world driving data. "Real-world driving data" includes and data or information about an environment in which vehicles operate. More particularly, "real-world driving data" includes data or information about vehicles in the environment. Still more particularly, "real-world driving data" includes data or information about drivers as viewed, detected, and/or sensed from outside of their respective vehicle, such as through a front windshield or other window of the vehicle.

In some arrangements, the real-world driving data source(s) 130 can include one or more sensors. "Sensor" means any device, component and/or system that can detect, determine, assess, monitor, measure, quantify and/or sense something. The one or more sensors can detect, determine, assess, monitor, measure, quantify and/or sense in real-time. As used herein, the term "real-time" means a level of processing responsiveness that a user or system senses as sufficiently immediate for a particular process or determination to be made, or that enables the processor to keep up with some external process.

In arrangements in which the real-world driving data source(s) 130 includes a plurality of sensors, the sensors can work independently from each other. Alternatively, two or more of the sensors can work in combination with each other. In such case, the two or more sensors can form a sensor network.

The real-world driving data source(s) 130 can include any suitable type of sensor, now known or later developed. For example, the real-world driving data source(s) 130 can include one or more cameras, one or more radar sensors, one or more LIDAR sensors, one or more sonar sensors, and/or one or more ranging sensors. The sensors can be configured to acquire, collect, and/or sense the real-world driving data 136.

In some arrangements, the real-world driving data source(s) 130 can be substantially stationary structures. In some arrangements, the real-world driving data source(s) 130 can be dynamic structures. In one or more arrangements, the real-world driving data source(s) 130 can include one or more vehicles 132 and/or one or more infrastructure devices 134.

"Vehicle" means any form of motorized transport, now known or later developed. Non-limiting examples of the vehicle(s) 132 include automobiles, motorcycles, aerocars, drones, aircraft, or any other form of motorized transport. The vehicle(s) 132 may be operated manually by a human driver, semi-autonomously by a mix of manual inputs from a human driver and autonomous inputs by one or more vehicle computers, fully autonomously by one or more vehicle computers, or any combination thereof.

"Infrastructure device" means any device positioned along or near a road and to which sensors are attached to or integrated into. In some arrangements, the infrastructure device(s) 134 can be stationary. Examples of infrastructure devices can include street lights, traffic lights, traffic signs, road signed, billboards, bridges, buildings, poles, etc. In some instances, the infrastructure device may be a road itself when sensors are embedded therein.

In some arrangements, the real-world driving data source(s) 130 can include any devices, components and/or systems that store real-world driving data 136. For instance, the real-world driving data 136 can be stored in the data store(s) 120 or in any other suitable type of data storage.

The system 100 can include one or more modules, at least some of which will be described herein. The modules can be implemented as computer readable program code that, when executed by a processor, implement one or more of the various processes described herein. One or more of the modules can be a component of the processor(s) 110, or one or more of the modules can be executed on and/or distributed among other processing systems to which the processor(s) 110 is operatively connected. One or more of the modules can be stored on one or more data stores 120. The modules can include instructions (e.g., program logic) executable by one or more processor(s) 110. Alternatively or in addition, the data store(s) 120 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein or portions thereof can be combined into a single module.

The system 100 can include one or more virtual driver modules 140. The virtual driver module(s) 140 can be configured to generate one or more virtual driver datasets 148. The virtual driver datasets 148 include virtual drivers performing target driver interactions. Examples of the target driver interactions can include gestures (e.g., waiving another vehicle to proceed, pointing, indicating to stop, indicating to go ahead, etc.), gaze (looking away from an ego vehicle, looking downward a phone, etc.), and/or non-verbal driver interactions. The virtual driver datasets 148 can contain photo-realistic renderings of the driver. The virtual driver datasets 148 can include static and/or dynamic renderings of the driver. It will be appreciated that the virtual driver modules(s) 140 can generate a large dataset in a relatively short amount of time. The virtual driver dataset(s) 148 can be stored in the data store(s) 120 or in any other suitable data store.

The virtual driver module(s) 140 can use one or more simulators 142, one or more human models 144, and/or procedural animation 146 to generate the virtual driver dataset 148. The simulator(s) 142 can be any simulator, now known or later developed. As an example, the simulator 142 can be Unreal Engine available from Epic Games, Inc., Vehicle y, North Carolina. The simulator 142 can be a combination of software and hardware configured to create a synthetic or simulated virtual drivers performing target driver interactions.

The human model(s) 144 can be any model of the human body, now known or later developed. The human model(s) 144 can be computer aided design (CAD) models. The human model(s) 144 can have any sufficient level of detail of one or more human characteristics. For instance, the human model(s) 144 can include the external appearance of a human being. The human model(s) 144 can include muscle data, skeletal data, linking data between the same type of data (e.g., how different bones of a human body interact) and/or between different types of data (e.g., how muscles and bones interact). The human model(s) 144 can include appearance data, clothing data, skin data, and/hair data. The human model(s) 144 can be for a range of human body types and/or sizes.

The procedural animation 146 can be any procedural animation techniques, known known or later developed. The procedural animation 146 can be either scripted or based on motion capture (MoCap). By using the procedural animation 146, vast amounts of data can be generated without requiring vast amounts of work hours by human animators.

The virtual driver module(s) 140 can generate the motions of target driver interactions while the driver sitting behind the wheel of a vehicle. In such context, it will be appreciated that the range of driver motions are constrained. Thus, relatively little animation is needed. Procedural animation is well suited for such instances because there is a strong prior knowledge of the expected motions of the driver.

The system 100 can include one or more detection modules 150. The detection module(s) 150 can be configured to analyze the real-world driving data 136 to detect and/or track one or more objects of interest and/or portions thereof over time. In some arrangements, the detection module(s) 150 can include one or more vehicle and/or window detection modules 152 and/or one or more human pose detection module 154.

The vehicle and/or window detection module(s) 152 can be configured to analyze the real-world driving data 136 to detect a vehicle and/or a window therein. The vehicle and/or window detection module(s) 152 can be one or more existing off-the-shelf detectors and/or the vehicle and/or window detection module(s) 152 can be trained to do so in any suitable manner. In some arrangements, the vehicle and/or window detection module(s) 152 can generate labels or annotations for detected items (vehicles, windows, etc.) in the real-world driving data 136. The vehicle and/or window detection module(s) 152 can use supervised learning on vehicle annotations refined to contain window annotations. Alternatively or additionally, the vehicle and/or window detection module(s) 152 can use a detector that can regress a shape model.

The vehicle and/or window detection module(s) 152 can include any suitable vehicle recognition software or other object recognition software. The vehicle recognition software or other object recognition software can analyze one or more images or other data included in the real-world driving data 136. The vehicle recognition software or other object recognition software can query predefined object profiles for possible matches. For instance, images included in the real-world driving data 136 can be compared to images in the predefined object profiles for possible matches. Alternatively or in addition, measurements or other aspects in the real-world driving data 136 can be compared to measurements or other information or data in the predefined object profiles. The vehicle and/or window detection module(s) 152 can identify the detected object as a particular type of vehicle if there is a match between the captured image and an image in the vehicle database. In this context, "match" or "matches" means that an image or other information/data included in the real-world driving data 136 is substantially identical to one or more of the predefined object profiles. For instance, the an image or other information included in the real-world driving data 136 and one or more of the images or other information in the predefined object profiles can match within a predetermined probability (e.g., at least about 85%, at least about 90%, at least about 95% or greater) or confidence level. In one or more arrangements, once a vehicle is detected, the vehicle and/or window detection module(s) 152 can be configured to identify one or more one or more windows (e.g., the front windshield, rear windshield, side windows, etc.) of a detected vehicle.

The human pose detection module(s) 154 can be configured to analyze the real-world driving data 136 to detect and track a human driver located behind a detected window. The human pose detection module(s) 154 can be a generic off-the-shelf detector, or it can be a custom trained detector. In some arrangements, the human pose detection module(s) 154 can be configured to analyze the window of a vehicle, as detected by the vehicle and/or window detection module(s) 152, to detect the driver behind the window. The vehicle and/or window detection module(s) 152 and the human pose detection module(s) 154 can be configured to work in cooperation with each other.

The human pose detection module(s) 154 can use a database of human poses and human body part relationships to track the driver over time. For instance, the human pose detection module(s) 154 can track one or more joints (e.g., neck, wrist, shoulder, etc.) over time. The human pose detection module(s) 154 can be configured to focus on specific joints and/or body parts that relate to gestures that a human driver may make to non-verbally communicate with other drivers. The human pose detection module(s) 154 can be configured to analyze a gaze of the driver. For instance, the human pose detection module(s) 154 can be configured to detect head angle/direction/orientation, eye direction/angle/orientation, eyelids open or closed, etc. The human pose detection module(s) 154 can detect other objects associated with a driver that may indicate a distraction (e.g., a mobile device, a beverage, etc.). The human pose detection module(s) 154 can be configured to detect specific joints and/or body parts that relate to gestures that a human driver may make to non-verbally signal to other drivers.

In some arrangements, the human pose detection module(s) 154 can include any suitable human body recognition and tracking software. The human body recognition software can analyze one or more images or other data included in the real-world driving data 136. In some arrangements, the human pose detection module(s) 154 can analyze the window as identified by the vehicle and/or window detection module(s) 152 to detect a human driver therein. The human body recognition software can query one or more human body profiles for possible matches.

The driver interaction module(s) 160 can be configured to process the real-world driving data 136 and the virtual driver dataset 148. The driver interaction module(s) 160 can be configured to augment the real-world driving data 136 using the virtual driver dataset 148 to generate an augmented driver dataset 165. The augmented driver dataset 165 can include edited images from the real-world driving data 136 where at least a portion of a tracked real driver is replaced by a portion of a virtual driver performing a target driver interaction from the virtual driver dataset 148. The target driver interaction can be a non-verbal interaction, such as a gesture or a gaze. The target driver interaction may or may not be intended as a communication with another driver. For example, the driver may wave to another driver, which is intended as a communication. As another example, a driver's gaze may be focused on a mobile device, indicating that the driver is distracted, which is not intended as a communication with another driver. The driver interaction module(s) 160 can be configured to minimally alter the real-world driving data 136 to the extent possible.

As an example, the driver in the real-world driving data 136 may simply be sitting behind the steering wheel with his or her hands on the steering wheel. It should be noted that the driver does not need to be performing a target driver interaction. Indeed, arrangements described herein are provided so that such specific data is not needed in the first place. In this example, the target driver interaction can be waving another vehicle through traffic with his or her right arm. The driver interaction module(s) 160 can be configured to replace the human driver's right shoulder, arm, and/or hand in the real-world driving data 136 with the right shoulder, arm, and/or hand from a virtual driver in the virtual driver dataset 148. The virtual driver's right shoulder, arm, and hand can be waving another vehicle through traffic. The other body portions of the human driver are not altered or are not substantially altered. In the augmented driver dataset 165, the drivers can be partially human drivers and partially virtual drivers. Thus, the augmented driver dataset 165 is a blend of real drivers and simulated drivers. In this way, the driver interaction module(s) 160 can generate the augmented driver dataset 165. It will be appreciated that the driver interaction module(s) 160 has generated a dataset that includes drivers performing target driver interactions.

It will be appreciated that the use of virtual drivers in connection with human drivers may result in artefacts that are not realistic. Thus, the driver interaction module(s) 160 can be configured to improve the realism of the augmented driver dataset 165. The driver interaction module(s) 160 can do so in any suitable manner. The driver interaction module(s) 160 can use "sim2real" domain adaptation techniques such as data augmentation (e.g., random ones, alpha-blending, explicitly simulating how drivers appear behind windows).

The originally detected pose of the human driver can be used to partially align the virtual driver with the original one (e.g., via matching their neck joints or shoulder joints or other static parts not involved in the interaction). Thus, the virtual driver can be anchored to the human driver as much as possible. For instance, in the above-noted right handed waving sequence, the driver's neck, left shoulder, left elbow, left wrist, and/or left hand can be fixed to the position of these body parts in the human driver. On the other hand, the right shoulder, right elbow, right wrist, and/or right hand can follow motion of the virtual driver regardless of what happens to these parts of the human driver. The driver interaction module(s) 160 can be configured to match substantially static body parts or substantially static body joints that are not involved in the target driver interaction.

Alternatively, the driver interaction module(s) 160 can use motion transfer from the virtual driver to the human driver. With motion transfer, the real-world driving data can be manipulated to achieve the target driver interaction. For instance, the motion transfer can be used to effectively move an arm of the human driver in the real-world driving data 136 by altering the pixels of the arm of the human driver to make it look like the human driver is waving.

The driver interaction module(s) 160 can be configured to train a model to detect the target driver interactions using the augmented driver dataset 165. For instance, an unsupervised domain adaptation algorithm can be used to train a model specifically for detecting drivers performing the target driver interactions. One example of an unsupervised domain adaptation algorithm is a general adversarial network (GAN). One example of a GAN is described in U.S. patent application Ser. No. 15/893,864, which is incorporated by reference herein in its entirety.

Now that the various potential systems, devices, elements and/or components of the system of training a model to detect driver interactions have been described, an example of an associated method will now be described. Various possible steps of such methods will now be described. The methods described may be applicable to the arrangements described above, but it is understood that the methods can be carried out with other suitable systems and arrangements. Moreover, the methods may include other steps that are not shown here, and in fact, the methods are not limited to including every step shown. The blocks that are illustrated here as part of the methods are not limited to the particular chronological order. Indeed, some of the blocks may be performed in a different order than what is shown and/or at least some of the blocks shown can occur simultaneously.

Turning to FIG. 2, an example of a method 200 is shown. At block 210, a dataset of virtual drivers performing a target driver interaction can be generated. The dataset can be generated by the virtual driver module(s) 140 and/or the processor(s) 110 using, for example, the simulator(s) 142, the human model(s) 144, procedural animation 146, and/or any combination or subset thereof. The virtual driver dataset can be stored in the data store(s) 120. The method 200 can continue to block 220.

At block 220, real-world driving data can be collected. The real-world driving data 136 can be collected from one or more real-world driving data sources 130. For instance, the real-world driving data can be obtained directly from one or more vehicles 132 and/or one or more infrastructure devices 134. Alternatively or additionally, the real-world driving data 136 can be obtained from a data store to which one or more vehicles 132 and/or one or more infrastructure devices 134 have stored the real-world driving data 136. The real-world driving data 136 can be stored in the data store(s) 120. The method 200 can continue to block 230.

At block 230, the real-world driving data can be analyzed to detect a window of a vehicle. In some arrangements, the vehicle can be initially detected, and then the window can be detected in the detected vehicle. The detection can be performed by the vehicle and/or window detection module(s) 152 and/or the processors 110. In one or more arrangements, the window can be a front windshield of the vehicle. The method 200 can continue to block 240.

At block 240, a human driver can be detected behind the detected window in the real-world driving data. The pose of the human driver behind the window can be tracked over time. The detection and tracking can be performed by the human pose detection module(s) 154 and/or the processor(s) 110. The method 200 can continue to block 250.

At block 250, the real-world driving data can be augmented. More particularly, the tracked human driver can be partially replaced by a portion of virtual driver performing a target driver interaction. Thus, an augmented driver dataset can be generated. The augmented driver dataset can be stored in one or more data stores. The augmenting can be performed by the driver interaction module(s) 160 and/or the processor(s) 110. The method 200 can continue to block 260.

At block 260, a machine learning model can be trained to detect the target driver interactions based on augmented real-world driving data. The augmented real-world driving data can be used in connection with machine learning for training, validation, evaluation, and/or model management purposes. The training can be performed using the driver interaction module(s) 160 and/or the processor(s) 110.

The method 200 can end. Alternatively, the method 200 can return to block 210 or to some other block. For instance, the method can return to block 230 to detect the window of a different vehicle in the real-world driving data. The method 200 can be repeated at any suitable point, such as at a suitable time or upon the occurrence of any suitable event or condition.

It will be appreciated that arrangements described herein can provide numerous benefits, including one or more of the benefits mentioned herein. For example, arrangements described herein can leverage simulation to provide a large set of useful training data. Thus, the need to acquire real-world data of the specifically desired training data can be minimized or even avoided. Arrangements described herein can be used to train a machine learning model to detect and track other drivers behind the window of their respective vehicle. The trained machine learning model can be used for decision-making in a vehicle. The trained model can be used in connection with one or more infrastructure devices to detect and track other drivers behind the window of their respective vehicle. Arrangements described herein can leverage simulation to train a deep neural network that can detect driver interactions, such as the gaze of the driver and/or gestures of the driver, from outside of the vehicle.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The term "or" is intended to mean an inclusive "or" rather than an exclusive "or." The phrase "at least one of . . . and . . . ." as used herein refers to and encompasses any and all possible combinations of one or more of the associated listed items. As an example, the phrase "at least one of A, B and C" includes A only, B only, C only, or any combination thereof (e.g. AB, AC, BC or ABC). As used herein, the term "substantially" or "about" includes exactly the term it modifies and slight variations therefrom. Thus, the term "substantially parallel" means exactly parallel and slight variations therefrom. "Slight variations therefrom" can include within 15 degrees/percent/ units or less, within 14 degrees/percent/units or less, within 13 degrees/percent/units or less, within 12 degrees/percent/ units or less, within 11 degrees/percent/units or less, within 10 degrees/percent/units or less, within 9 degrees/percent/ units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degree/percent/unit or less. In some instances, "substantially" can include being within normal manufacturing tolerances.

Aspects herein can be embodied in other forms without departing from the spirit or essential attributes thereof. Accordingly, reference should be made to the following claims, rather than to the foregoing specification, as indicating the scope of the invention.

What is claimed is:

1. A method of training a model to detect driver interactions through a window of a vehicle, the method comprising:
   detecting a human driver behind a window of a vehicle in real-world driving data;
   tracking the human driver behind the window of the vehicle over time;
   augmenting, using at least one of simulation and procedural animation, the real-world driving data by replacing at least a portion of the human driver with at least a portion of a virtual driver performing a target driver interaction to generate augmented real-world driving data, wherein the human driver is not performing the target driver interaction in the real-world driving data, the augmented real-world driving data including photo-realistic renderings of the human driver performing the target driver interaction, whereby useful data is generated without having to acquire real-world data of a driver actually performing the target driver interaction as viewed through the window from outside the vehicle; and
   training a model, using the augmented real-world driving data, to detect the target driver interaction.

2. The method of claim 1, wherein the target driver interaction includes a gaze or a gesture.

3. The method of claim 1, further including:
   generating a dataset of virtual drivers performing a target driver interaction.

4. The method of claim 3, wherein generating the dataset of virtual drivers performing the target driver interaction is performed using a simulator, human computer models, procedural animation, or any combination thereof.

5. The method of claim 4, wherein procedural animation includes scripted procedural animation techniques or motion capture.

6. The method of claim 1, further including:
   at least partially aligning at least a portion of the virtual driver with an originally detected pose of the human driver.

7. The method of claim 6, wherein at least partially aligning is performed by matching substantially static body parts or substantially static body joints that are not involved in the target driver interaction.

8. The method of claim 6, wherein at least partially aligning is performed using motion transfer from the virtual driver to the human driver.

9. The method of claim 1, wherein the window is a front windshield.

10. The method of claim 1, wherein the detecting and the tracking are performed using a human pose detector.

11. The method of claim 1, further including:
    improving the realism of the augmented real-world driving data by using simulation-to-real domain adaptation techniques.

12. The method of claim 1, wherein the real-world driving data is acquired from at least one of: one or more vehicles and one or more road infrastructure devices.

13. A system for training a model to detect driver interactions through a window of a vehicle, the system comprising:
    one or more processors, the one or more processors being programmed to initiate executable operations comprising:
       detecting a human driver behind a window of a vehicle in real-world driving data;
       tracking the human driver behind the window of the vehicle over time;
       augmenting, using at least one of simulation and procedural animation, the real-world driving data by replacing at least a portion of the human driver with at least a portion of a virtual driver performing a target driver interaction to generate augmented real-world driving data, wherein the human driver is not performing the target driver interaction in the real-world driving data, the augmented real-world driving data including photo-realistic renderings of the human driver performing the target driver interaction, whereby useful data is generated without having to acquire real-world data of a driver actually performing the target driver interaction as viewed through the window from outside the vehicle; and
       training a model, using the augmented real-world driving data, to detect the target driver interaction.

14. The system of claim 13, wherein the target driver interaction includes a gaze or a gesture.

15. The system of claim 13, wherein the executable operations further include:
    generating a dataset of virtual drivers performing the target driver interaction.

16. The system of claim 15, wherein generating the dataset of virtual drivers performing the target driver interaction is performed using a simulator, human computer models, procedural animation, or any combination thereof.

17. The system of claim 16, wherein the procedural animation includes scripted procedural animation techniques or motion capture.

18. The system of claim 13, wherein the executable operations further include:
    at least partially aligning at least a portion of the virtual driver with an originally detected pose of the human driver.

19. The system of claim 13 wherein the executable operations further include:
    detecting the window of the vehicle in the real-world driving data.

20. The system of claim 13, wherein the detecting and the tracking are performed using a human pose detector.

* * * * *